(12) United States Patent  
Eidelson et al.

(10) Patent No.: US 9,338,403 B2  
(45) Date of Patent: May 10, 2016

(54) PERSISTENT CONVERSATIONS

(71) Applicants: Benjamin David Eidelson, Palo Alto, CA (US); Randall Sarafa, San Francisco, CA (US); Mayur Kamat, Bothell, WA (US); Ujjwal Singh, Palo Alto, CA (US); Peter Pawlowski, Menlo Park, CA (US); Richard Fulcher, Sunnyvale, CA (US); Peter Ng, San Francisco, CA (US); Evan Stephen Millar, Menlo Park, CA (US); Rhett Robinson, Kirkland, WA (US)

(72) Inventors: Benjamin David Eidelson, Palo Alto, CA (US); Randall Sarafa, San Francisco, CA (US); Mayur Kamat, Bothell, WA (US); Ujjwal Singh, Palo Alto, CA (US); Peter Pawlowski, Menlo Park, CA (US); Richard Fulcher, Sunnyvale, CA (US); Peter Ng, San Francisco, CA (US); Evan Stephen Millar, Menlo Park, CA (US); Rhett Robinson, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/748,526

(22) Filed: Jan. 23, 2013

(65) Prior Publication Data

US 2014/0204173 A1 Jul. 24, 2014

(51) Int. Cl.
*G06F 3/00* (2006.01)
*H04N 7/15* (2006.01)
*H04L 12/18* (2006.01)
*H04M 3/56* (2006.01)
*G06Q 10/10* (2012.01)
*H04L 12/58* (2006.01)

(52) U.S. Cl.
CPC ............ *H04N 7/157* (2013.01); *G06Q 10/107* (2013.01); *H04L 12/1813* (2013.01); *H04L 12/1831* (2013.01); *H04L 51/32* (2013.01); *H04M 3/567* (2013.01); *H04N 7/155* (2013.01)

(58) Field of Classification Search
USPC ......................................................... 715/758
See application file for complete search history.

(56) References Cited

U.S. PATENT DOCUMENTS

| 7,293,049 | B2 | 11/2007 | Kadyk et al. |
| 7,441,199 | B2 | 10/2008 | Zenith |
| 7,512,400 | B2 | 3/2009 | Starbuck et al. |
| 7,603,467 | B2 | 10/2009 | Malik et al. |
| 7,743,022 | B2 | 6/2010 | Kaasten et al. |

(Continued)

FOREIGN PATENT DOCUMENTS

WO 2014/013356 1/2014

OTHER PUBLICATIONS

Final Office Action cited in corresponding U.S. Appl. No. 13/748,582 mailed Jan. 24, 2014.

(Continued)

*Primary Examiner* — Maria El-Zoobi

(57) ABSTRACT

Systems, methods and computer readable media for persistent conversations are described. In some implementations, a method can include receiving a communication message sent from a first user to at least one other user, and generating a persistent conversation object having a conversation content section and conversation state information. The method can also include storing the communication message in the conversation content section of the persistent conversation object, and forwarding the communication message to the at least one other user. The method can further include updating the conversation state information to reflect the receiving, storing and forwarding of the communication message.

16 Claims, 7 Drawing Sheets

(56) References Cited

U.S. PATENT DOCUMENTS

| | | | |
|---|---|---|---|
| 7,769,144 B2 | 8/2010 | Yao et al. | |
| 8,001,102 B2 | 8/2011 | Szeto et al. | |
| 8,160,563 B2 | 4/2012 | Chen et al. | |
| 8,321,581 B2 | 11/2012 | Katis et al. | |
| 8,355,698 B2 | 1/2013 | Teng | |
| 8,411,046 B2 | 4/2013 | Kruzeniski | |
| 8,412,845 B2 | 4/2013 | Katis et al. | |
| 8,605,718 B2 | 12/2013 | Hemar et al. | |
| 2004/0015548 A1* | 1/2004 | Lee | H04L 12/1827 709/204 |
| 2004/0223599 A1 | 11/2004 | Bear et al. | |
| 2005/0080848 A1 | 4/2005 | Shah | |
| 2007/0006094 A1* | 1/2007 | Canfield | G06Q 10/107 715/781 |
| 2007/0033534 A1* | 2/2007 | Kim et al. | 715/758 |
| 2010/0199340 A1 | 8/2010 | Jonas et al. | |
| 2011/0148916 A1 | 6/2011 | Blattner | |
| 2011/0216071 A1* | 9/2011 | Klassen | G06F 15/02 345/467 |
| 2011/0222515 A1 | 9/2011 | Wang et al. | |
| 2011/0296324 A1 | 12/2011 | Goossens et al. | |
| 2011/0320536 A1 | 12/2011 | Lobb et al. | |
| 2012/0004956 A1 | 1/2012 | Huston et al. | |
| 2012/0016941 A1 | 1/2012 | Douckine et al. | |
| 2012/0278475 A1 | 11/2012 | Papkipos et al. | |
| 2013/0325922 A1 | 12/2013 | Chaudhri et al. | |

OTHER PUBLICATIONS

International Search Report and Written Opinion, dated Jun. 23, 2014, for related PCT Application No. PCT/US14/12581.
Preinterview First Office Action cited in corresponding U.S. Appl. No. 13/748,582 mailed Oct. 30, 2013.
Non-Final Office Action cited in corresponding U.S. Appl. No. 13/748,582 mailed Jul. 24, 2014.
Final Office Action dated May 19, 2015 for U.S. Appl. No. 13/748,579.
Pre-Interview First Office Action dated Dec. 19, 2014 for U.S. Appl. No. 13/748,579.
Pre-Interview First Office Action dated Dec. 8, 2014 for U.S. Appl. No. 13/748,581.
Notice of Allowance dated Jun. 17, 2015 for U.S. Appl. No. 13/748,582.
Final Office Action dated Nov. 28, 2014 for U.S. Appl. No. 13/748,582.
Non-Final Office Action dated Jul. 24, 2014 for U.S. Appl. No. 13/748,582.
First Action Interview Office Action received in U.S. Appl. No. 13/748,581, Nov. 2, 2015.
Notice of Allowance received in U.S. Appl. No. 13/748,579, Oct. 29, 2015.
Notice of Allowance received in U.S. Appl. No. 13/748,582, Sep. 23, 2015.

* cited by examiner

PERSISTENT CONVERSATIONS

BACKGROUND

Computer and mobile device users may be increasingly communicating with each other using numerous different devices ranging from a desktop computer to a smartphone and/or tablet device, and users may often interact with more than one device type during a given day. Users may also be communicating using a variety of channels and protocols such as text messaging, instant messaging, email, social network messages, chat, one-to-one and/or multi-way audio and/or video conferences (audio/video conference), and the like. Communications sent and received at one device may not be reflected in user interfaces on other devices associated with the same user.

In a communication stream, such as a text messaging conversation between one user and one or more other users, it may not be apparent at what point in the conversation stream each participant in the conversation has most recently viewed the conversation and what the current viewing status is of each participant.

SUMMARY

Some implementations relate generally to electronic communication, and, more particularly, to electronic communications via persistent conversations.

Some implementations can include a method comprising receiving a communication message sent from a first user to at least one other user. The communication message can include one or more of a text message, an image file, an audio file, a video file, a phone call, a fax and a one-to-one and/or multi-way video and/or audio conference.

The method can also include generating a persistent conversation object having a conversation content section and conversation state information. The state information can include an indication of whether history tracking is enabled, a level corresponding to each user indicating a point in the conversation where each user last had focus on the conversation, and a focus state for each user.

For example, the focus state can be one of focused, unfocused and typing. A focused state can be determined on a mobile device, for example, as the conversation client application being open and having visibility on the device display. On a desktop or laptop computer the focused state can be determined from the keyboard and/or mouse focus. In general, any indication that a conversation client application is visible or in use can be used to determine the focused state. The unfocused state can be determined as the opposite of the focused state (e.g., the conversation client application is not open (for mobile devices) or does not have keyboard or mouse focus (for desktop and laptop computers). The typing state can be determined based on the focused state coupled with an indication that the user is entering text (or otherwise entering data for the conversation such as audio, video or the like).

The method can further include storing the communication message in the conversation content section of the persistent conversation object and forwarding the communication message to the at least one other user. The method can also include updating the conversation state information to reflect the receiving, storing and forwarding of the communication message.

Some implementations can include a method comprising receiving a communication message sent from a first user to at least one other user, and generating a persistent conversation object having a conversation content section and conversation state information.

The method can include storing the communication message in the conversation content section of the persistent conversation object and forwarding the communication message to the at least one other user. The method can also include updating the conversation state information to reflect the receiving, storing and forwarding of the communication message.

In some implementations of the method, the communication message can include one or more of a text message, an image file, an audio file, a video file, a phone call, a fax and a one-to-one and/or multi-way video conference. The state information can include an indication of whether history tracking is enabled. The state information can also include a level corresponding to each user indicating a point in the conversation where each user last had focus on the conversation and a focus state for each user.

The method can also include providing for display a user interface including at least a portion of the conversation content, an avatar representing each user participating in the conversation and a visual indication of conversation state information. The method can further include updating the avatar appearance based on the focus state of the user corresponding to the avatar. The method can include rendering, in a display of the conversation content, each avatar at a watermark point of the user associated with the avatar.

In some implementations, the visual indication can include an indication of whether history tracking is enabled. The method can also include providing a rendering of the conversation content section and the conversation state information for display on each of a plurality of devices associated with a single user participating in the persistent conversation. The method can further include automatically updating the rendering on the plurality of devices so as to provide the user with a uniform view of the persistent conversation across the plurality of devices.

Some implementations can include a system having one or more computers configured to perform operations. The operations can include receiving a communication message sent from a first user to at least one other user and generating a persistent conversation object having a conversation content section and conversation state information.

The operations can also include storing the communication message in the conversation content section of the persistent conversation object and forwarding the communication message to the at least one other user. The operations can further include updating the conversation state information to reflect the receiving, storing and forwarding of the communication message.

The communication message can include one or more of a text message, an image file, an audio file, a video file, a phone call, a fax and a one-to-one and/or multi-way video conference. The state information can include an indication of whether history tracking is enabled. The state information can include a level corresponding to each user indicating a point in the conversation where each user last had focus on the conversation. The state information can include a focus state for each user.

The operations can also include providing for display a user interface including at least a portion of the conversation content, an avatar representing each user participating in the conversation and a visual indication of conversation state information. The operations can further include updating the avatar appearance based on the focus state of the user corresponding to the avatar.

The operations can also include rendering, in a display of the conversation content, each avatar at a watermark point of the user associated with the avatar. The operations can also include providing a rendering of the conversation content section and the conversation state information for display on each of a plurality of devices associated with a single user participating in the persistent conversation. The operations can include automatically updating the rendering on the plurality of devices so as to provide the user with a uniform view of the persistent conversation across the plurality of devices.

These and other features may provide one or more of the following advantages. The creation and storing of a central persistent conversation object can permit a user to view the conversation on multiple devices. Also, the persistent conversation object can store state information which can permit users to know where each conversation participant last had focus on the conversation. The state information can also be used to convey the focus state of conversation participants and provide an indication of whether history tracking is enabled or disabled.

DETAILED DESCRIPTION

In some implementations, a method can include providing persistent conversations between two or more users. Each persistent conversation can be stored in a central conversation storage object having conversation content and conversation state information. Some implementations can include providing a persistent conversation from a central conversation storage object and automatically updating the rendering of the conversation so that an up-to-date view of the conversation can be displayed on multiple diverse devices such as a desktop or laptop computer, a smartphone and a tablet device.

Some implementations of the method can include receiving a communication message sent from a first user to at least one other user. The communication message can be one or more of a text message, an image file, an audio file, a video file, a phone call, a fax and a one-to-one and/or multi-way video conference. The method can also include generating a persistent conversation object having a conversation content section and conversation state information. The method can include storing the communication message in the conversation content section of the persistent conversation object and forwarding the communication message to the at least one other user. The method can further include updating the conversation state information to reflect the receiving, storing and forwarding of the communication message.

A persistent conversation device client can monitor the focus state of a user. The focus state can include an indication focused, unfocused and typing. Persistent conversation state information can also include a level corresponding to each user indicating a point in the conversation where each user last had focus on the conversation.

Persistent conversations can have history tracking enabled or disabled. The conversation state information can include an indication of whether history tracking is enabled.

The method can include providing, for display, a user interface including at least a portion of the conversation content, an avatar representing each user participating in the conversation and a visual indication of conversation state information.

In some implementations the method can include updating the avatar appearance based on the focus state of the user corresponding to the avatar. The method can also include rendering, in a display of the conversation content, each avatar at a watermark point of the user associated with the avatar.

While some implementations are discussed herein in relation to certain example message types such as text messaging (e.g., short message service), email, chat, social network messages, one-to-one and/or multi-way audio/video conferences and phone calls, it will be appreciated that persistent conversations can be applied to other know or later developed message or communication types.

Figure 1:
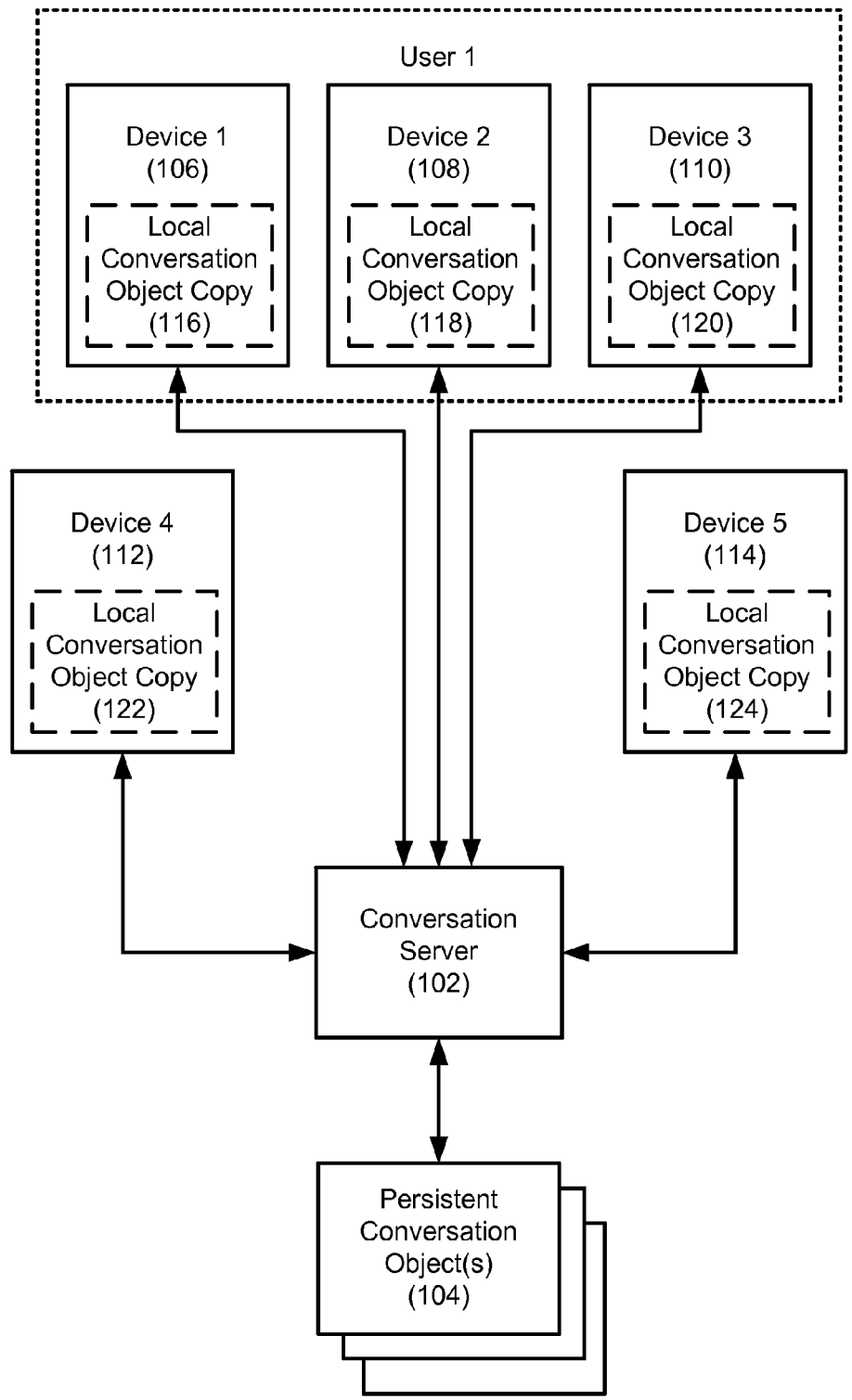
FIG. 1 is a diagram of an example persistent conversation system and user devices in accordance with some implementations.

As shown in FIG. 1, a persistent conversation environment can include a conversation server 102 and one or more persistent conversation objects 104. A plurality of devices (106-114) can be in communication with the conversation server 102. Each device (106-114) can have a local copy (116-124, respectively) of at least a portion of a persistent conversation object (104). Multiple devices can be associated with a single user. For example, Devices 1, 2 and 3 (106-110) are associated with User 1.

In operation, the conversation server 102 receives communication messages from one or more of the devices (106-114) and adds the communication message to a corresponding persistent conversation object (and can first create the persistent conversation object, if one does not exist yet for the conversation). The conversation server updates conversation state information for the persistent conversation object and then sends the communication message and updates, notifications of the newly received communication message and/or the updated conversation state information to the other devices associated with users participating in the corresponding conversation.

Each device can be executing a persistent conversation client that is kept in synchronization with the persistent conversation object(s) 104 stored and maintained by the conversation server 102. The central copy of the persistent conversation object can be a canonical copy of the conversation and/or contain the canonical state of the conversation. A local copy of at least a portion of a persistent conversation object can be cached at each device executing a conversation client associated with a participant in the conversation.

A conversation is initiated when a user starts a conversation with one or more other users. A persistent conversation can be given a name and participants can view members in the conversation and add members to the conversation. A conversation can be fully democratic (e.g., have no owner or moderator). Alternatively, a conversation could be moderated.

Conversations can be one-to-one or group conversations (e.g., at least three participants in a one-to-many or many-tomany arrangement). In any group conversation (e.g., three or more participants), a user can leave the conversation. Any user in any group conversation can add other users to the conversation. In some implementations, a conversation that originates as a one-on-one conversation cannot be converted to a group conversation. In a group conversation, users participating in the conversation can invite other users into the conversation by adding them to the conversation participants (e.g., by adding the new user(s) to the distribution list of users receiving a message in the conversation).

A user participating in a one-on-one conversation may not leave the conversation, but may delete the conversation (or one or more messages within the conversation). A user can delete individual messages from a conversation or the entire conversation. When a conversation (or message) is deleted, it may be removed from the user's device(s), but can remain stored in the persistent conversation object storage (e.g., 104).

A persistent conversation object can include conversation content and state information. The conversation state information can include a current focus state and notification state for each of the conversation participants. For example, the focus state can be one of focused, unfocused and typing. A focused state can be determined on a mobile device, for example, as the conversation client application being open and having visibility on the device display. On a desktop or laptop computer the focused state can be determined from the keyboard and/or mouse focus. In general, any indication that a conversation client application is visible or in use can be used to determine the focused state. The unfocused state can be determined as the opposite of the focused state (e.g., the conversation client application is not open (for mobile devices) or does not have keyboard or mouse focus (for desktop and laptop computers). The typing state can be determined based on the focused state coupled with an indication that the user is entering text (or otherwise entering data for the conversation such as audio, video or the like). Focus states are discussed below regarding FIGS. 3 and 7.

In addition to focus state, the conversation state information can include a watermark or level in the conversation at which each user was last focused on the conversation. This can be used to indicate or suggest a point at which each participant stopped reading the conversation. The watermark can also be used to indicate a read or unread state of the conversation. For example, if the watermark is at the lowest point in the conversation (e.g., at the most recent content addition) then the conversation can be considered to be read by the user. However, if the watermark for a user is not at the lowest point in the conversation then the conversation could be considered to be at least partially unread by that user. Watermarks for a one-on-one conversation are described below regarding FIG. 4 and FIG. 7.

The conversation state information can also include an indication of whether history tracking is enable or disabled. When history tracking is enabled, the conversation content is permanently stored in the persistent conversation object. When the history tracking is disabled (e.g., one or more users wants the conversation "off the record") the conversation will only be stored in the persistent conversation object for a finite time and then deleted. The user interface can be modified to show history tracking disabled (as discussed below regarding FIG. 6). The history enabled/disabled can be a global setting that affects all participants in the conversation.

The conversation state information can also include the name of the conversation and a list of the participants. Focus state, notification state, watermark and history tracking state information indications are applicable to both one-on-one and group conversations.

Figure 2:
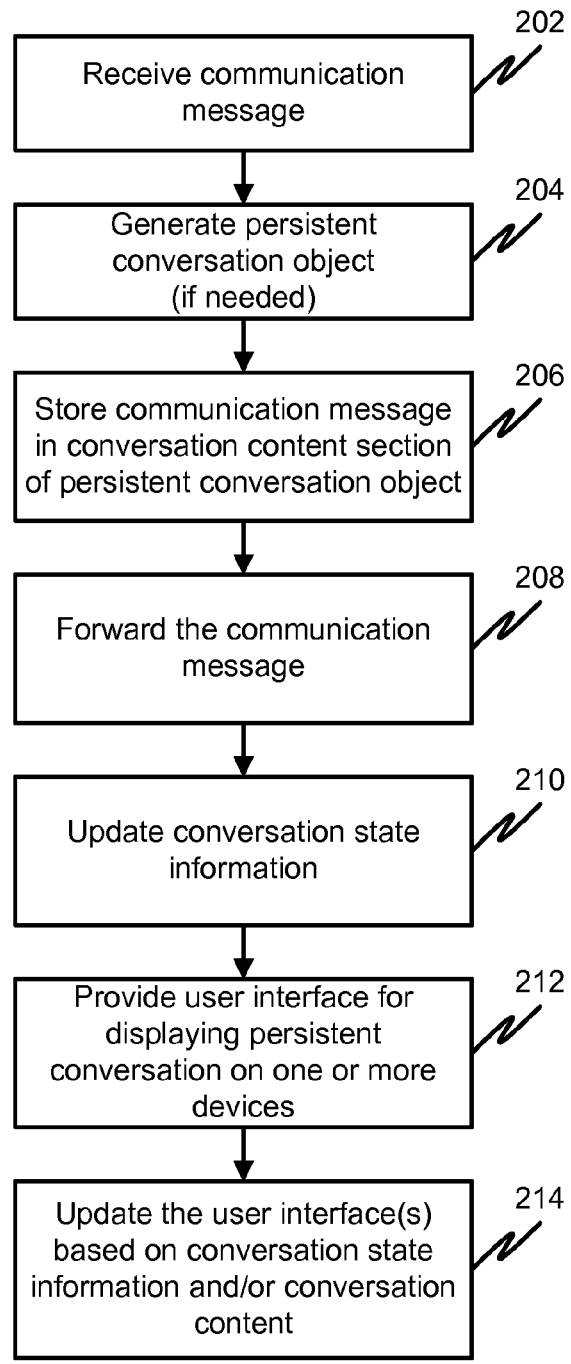
FIG. 2 is a flow chart of an example method for providing persistent conversations in accordance with some implementations.

FIG. 2 is a flow chart of an example method 200 for providing persistent conversations in accordance with some implementations. Processing begins at 202, where a communication message from one user to one or more other users is received. For example, the communication message can be received at a conversation server 102. The communication message can include one or more protocols or types, such as those mentioned above. Processing continues to 204.

At 204, a persistent conversation object is generated (or created) if one does not already exist for the conversation. Generating a persistent conversation object can include adding the communication message (or information representing or linking to the message) to the conversation content section of the conversation object. Generating can also include initializing the conversation state information to reflect the new conversation and the arrival of the communication message. The initial conversation participants can be extracted from the list of intended recipients of the communication message. The conversation can be given a default name. If a persistent conversation object already exists for the conversation, then the existing conversation object can be used. Processing continues to 206.

At 206, the communication message is stored in the conversation content section of the persistent conversation object. Processing continues to 208.

At 208, the communication message is forwarded to the other conversation participants. For example, the conversation server 102 could forward a message from Device 1 106 to the other devices (108-114). The forwarding could be accomplished by synchronizing the local copy of the conversation on each device with the canonical conversation object (e.g., 104). A conversation client on each device could be used to synchronize and update the local conversation object copy (e.g., 116-124). Processing continues to 210.

At 210 the conversation state information is updated to reflect the new communication message and the focus and notification states of the users. Processing continues to 212.

At 212, a user interface for displaying the persistent conversation on each device associated with a participant in the conversation is provided. For example, the user interface could be part of (or coupled to) the conversation client on each device (106-114). Processing continues to 214.

At 214, the user interfaces are updated base on the conversation state information and the conversation content. For example, the user interface could be updated based on synchronizing the content and state information for the conversation so that the user interface on each device shows the new communication message and also reflects real time (or near real time) conversation state information. It will be appreciated that 202-214 can be repeated in whole or in part in order to accomplish a contemplated persistent conversation task.

Figure 3:
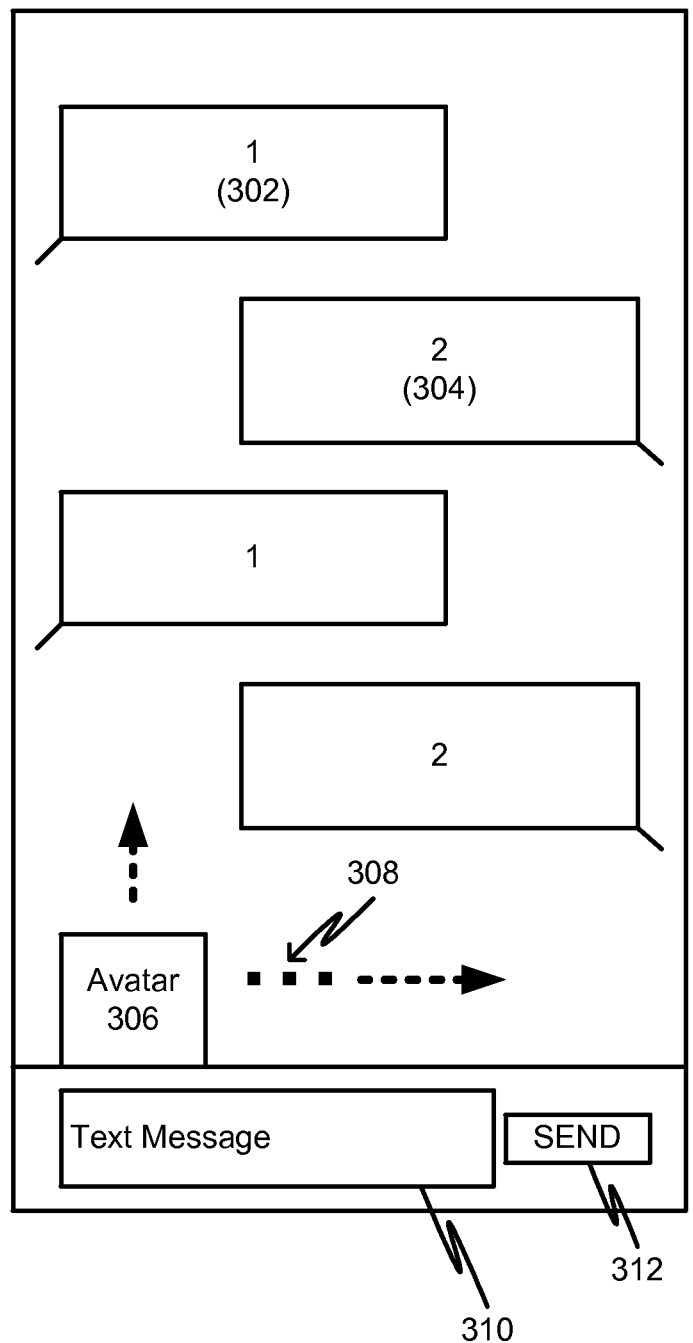
FIG. 3 is a diagram of an example persistent conversation graphical user interface in accordance with some implementations.

FIG. 3 is a diagram of an example persistent conversation graphical user interface 300 in accordance with some implementations. The user interface 300 includes communication messages from a first user (302) and a second user (304). A conversation participant can be represented by an avatar 306. When a user is in a focused or typing state, the avatar 306 can animate and rise in an upward direction as shown by the dashed arrow pointing toward the top of the figure. Also, when the user associated with the avatar 306 is typing, an indication can be made (308) that the user is typing. The indication can include animated dots as shown by the dashed arrow pointing to the right of 306 in FIG. 3.

The user interface 300 can also include a text entry element 310 and a send button 312 for sending the message typed in the text entry element 310.

Figure 4:
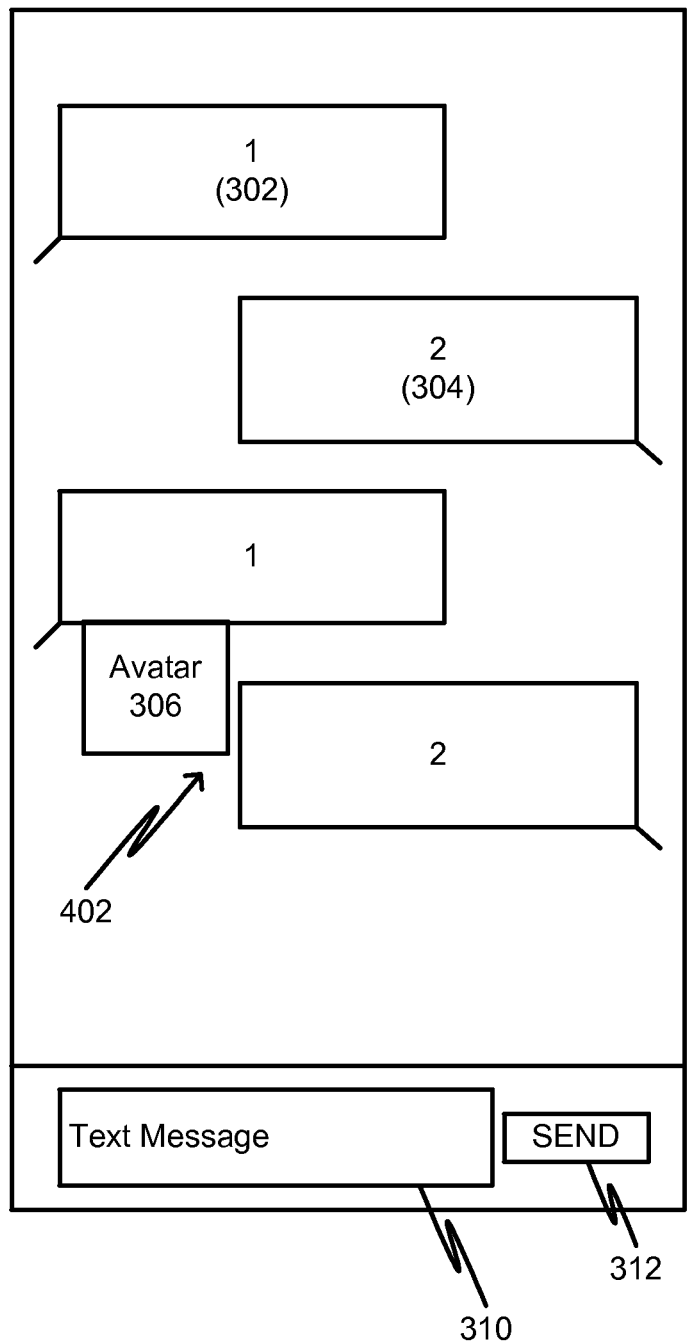
FIG. 4 is a diagram of an example persistent conversation graphical user interface in accordance with some implementations.

FIG. 4 is a diagram of an example persistent conversation graphical user interface in accordance with some implementations. In addition to the elements identified above in connection with FIG. 3, there is shown in FIG. 4 an example of a watermark in which the avatar 306 is placed at a location 402 indicating the watermark for the user associated with the avatar 306.

Figure 5:
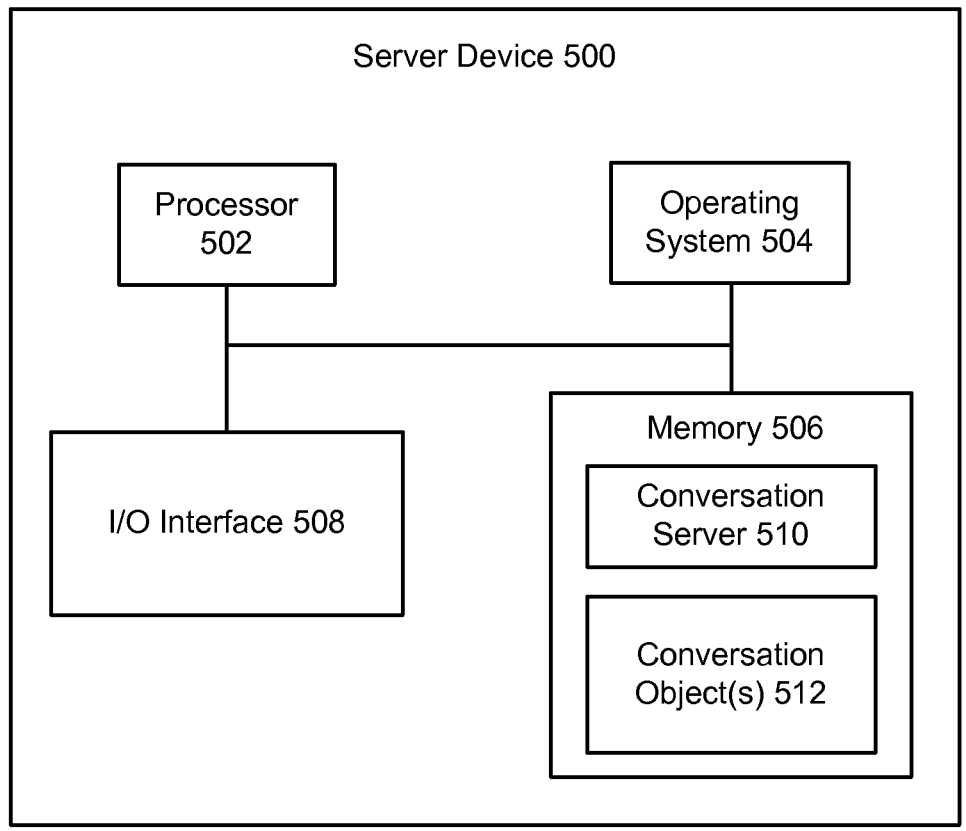
FIG. 5 is a diagram of an example server system in accordance with some implementations.

FIG. 5 is a diagram of an example server device 500 that can be used to create, manage, distribute and cause to be displayed persistent conversations in accordance with some implementations. The server device 500 includes a processor 502, operating system 504, memory 506 and I/O interface 508. The memory 506 can include a persistent conversation server 510 and one or more persistent conversation objects 512.

In operation, the processor 502 may execute the conversation server application 510 stored in the memory 506. The conversation server 510 can include software instructions that, when executed by the processor, cause the processor to perform operations for creating, managing, distributing and causing to be displayed persistent conversations in accordance with the present disclosure (e.g., the conversation server 510 can perform one or more of steps 202-214 described above and, in conjunction, can access the conversation object(s) 512). The conversation server 510 can also operate in conjunction with the operating system 504.

Persistent conversation can be used among members (or users) of a social network. For example, the messages sent between a first social network member and one or more other members in the social graph of the first social network member (or to users outside of the social network) can be exchanged via a persistent conversation as described above.

Figure 6:
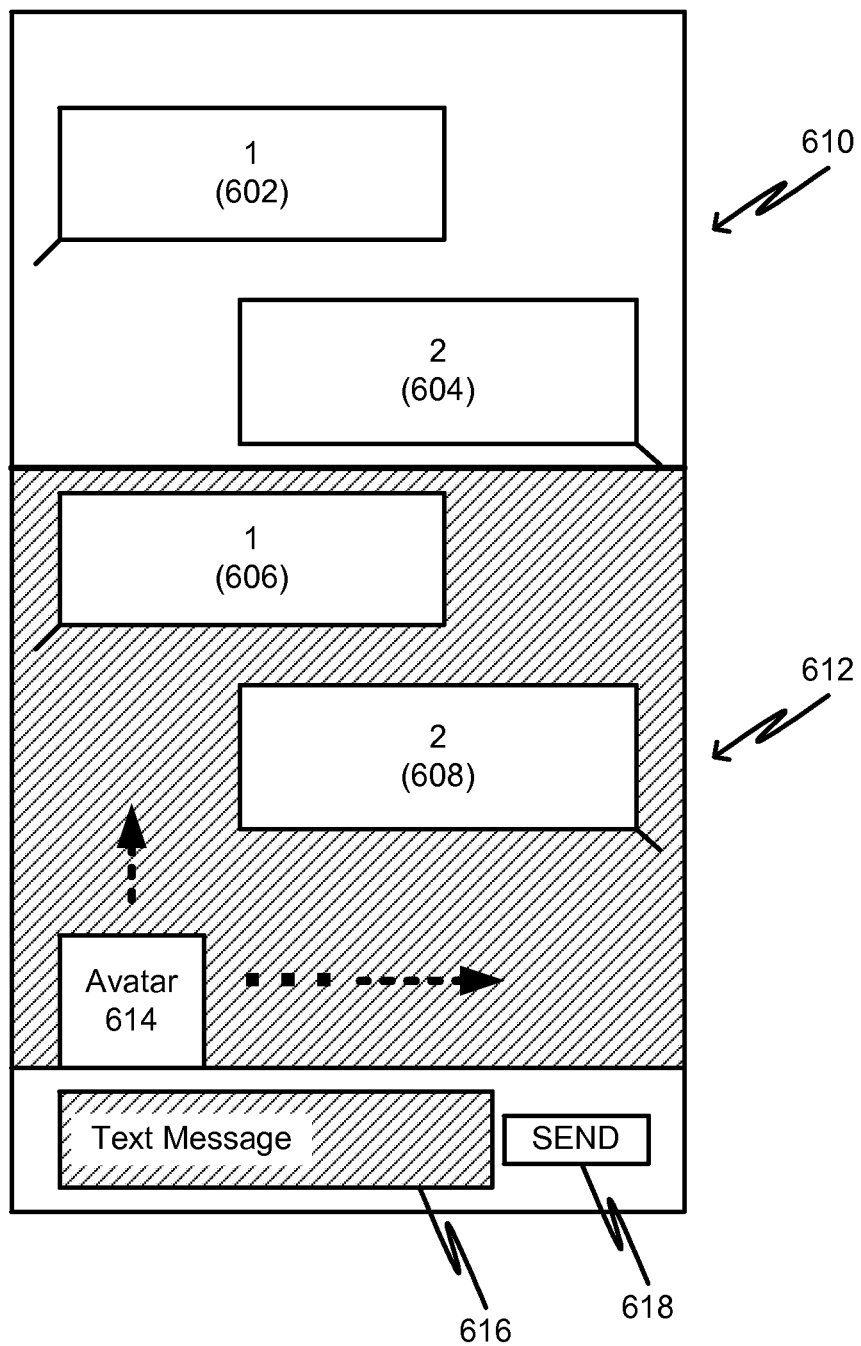
FIG. 6 is a diagram of an example persistent conversation graphical user interface in accordance with some implementations.

FIG. 6 is a diagram of an example persistent conversation graphical user interface 600 in accordance with some implementations. In particular, the user interface 600 includes messages from a first user (602) and a second user (604) in a section of the conversation in which history tracking was enabled 610. There are also messages from the first user (606) and the second user (608) in a section of the conversation in which the history has been disabled 612.

The user interface 600 includes an avatar as described above and a text message area 616 and a send button 618.

When history is disabled (e.g., the conversation is "off the record") the conversation rendering is changed for the section of the conversation which does not have history enabled (e.g., 612). Also, the compose experience can be changed (e.g., the background change in the text box 616) to indicate history is disabled.

Figure 7:
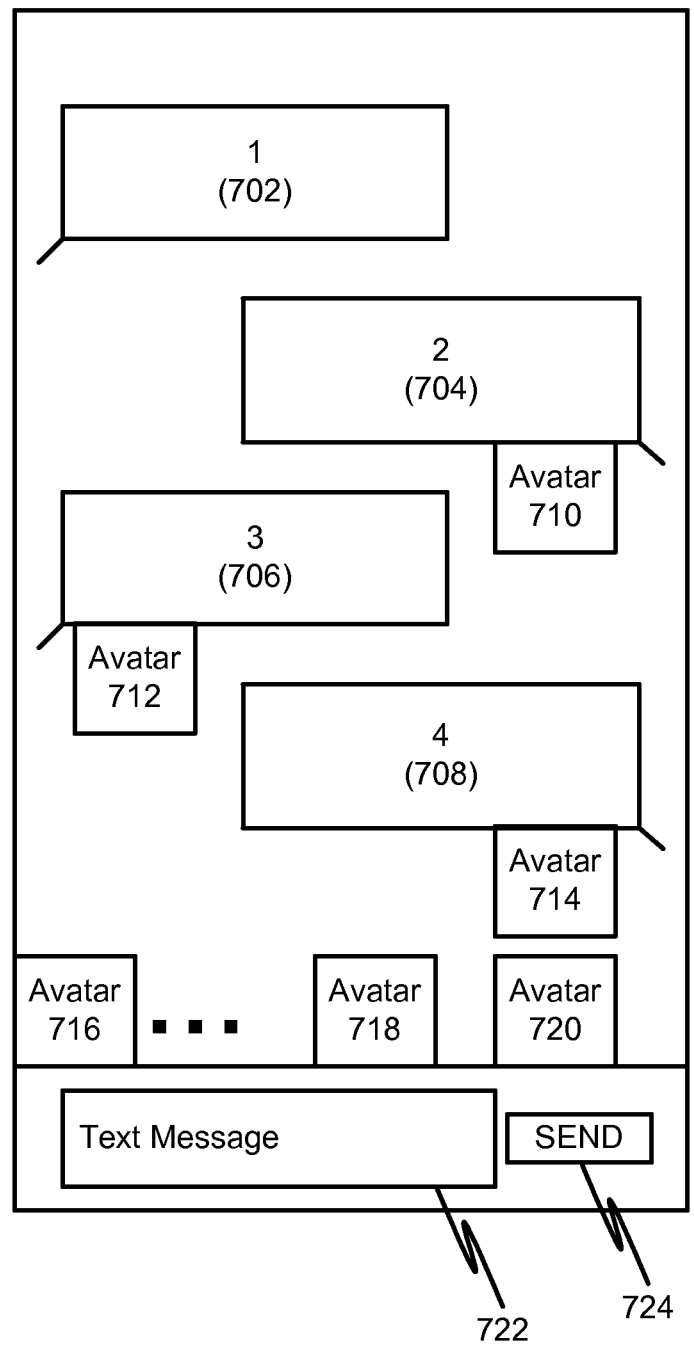
FIG. 7 is a diagram of an example persistent conversation graphical user interface in accordance with some implementations.

FIG. 7 is a diagram of an example persistent conversation graphical user interface 700 in accordance with some implementations. In particular, the user interface 700 shows a group conversation with multiple watermarks and avatars. Messages (702-708) can come from four different respective users. Each avatar (710-720) can be used to represent the watermark and/or state for each user corresponding to that avatar.

For example, the user associated with avatar 710 has a watermark at message 2 (704). The user associated with avatar 712 has a watermark at message 3 (706). The user associated with avatar 714 has a watermark at message 4 (708).

Users associated with avatars 716-720 are giving the conversation (or conversation client application) focus. The user corresponding to avatar 716 is typing.

The user interface 700 also includes a text entry element 722 and a send button 724.

The server (e.g., 500) can include, but is not limited to, a single processor system, a multi-processor system (co-located or distributed), a cloud computing system, or a combination of the above.

The client (or user, member or conversation participant) device can include, but is not limited to, a desktop computer, a laptop computer, a portable computer, a tablet computing device, a smartphone, a feature phone, a personal digital assistant, a media player, an electronic book reader, an entertainment (or computing) system of a vehicle or the like. Other examples of devices include computing and/or display systems built into windows, walls, furniture, glasses, goggles, wrist watches, clothing or the like. In general, any computing device capable of implementing one or more of the methods described herein can be used.

The network connecting user devices to a conversation server can be a wired or wireless network, and can include, but is not limited to, a WiFi network, a local area network, a wide area network, the Internet, or a combination of the above.

The data storage, memory and/or computer readable medium can be a magnetic storage device (hard disk drive or the like), optical storage device (CD, DVD or the like), electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or computer readable media having stored instructions for performing one or more persistent conversation tasks as described herein). The stored software instructions can be executed on a programmed general purpose computer, a special purpose computer, a microprocessor, or the like.

It is, therefore, apparent that there is provided, in accordance with the various example implementations disclosed herein, systems, methods and computer readable media for persistent conversations.

While the disclosed subject matter has been described in conjunction with a number of implementations, it is evident that many alternatives, modifications and variations would be or are apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
receiving a communication message sent from a first user to a plurality of other users, wherein the communication message includes one or more of a text message, an image file, an audio file, a video file, a phone call, a fax, a one-to-one audio/video conference and a multi-way audio/video conference;
generating a persistent conversation object representing a conversation and having a conversation content section and conversation state information, wherein the state information includes an indication of whether history tracking is enabled, a level corresponding to the first user and each of the plurality of other users indicating a point in the conversation where each corresponding user last had focus on the conversation, and a focus state for each corresponding user;
storing the communication message in the conversation content section of the persistent conversation object;

forwarding the communication message to the plurality of other users;

updating the conversation state information to reflect a level in the conversation at which the first user and each of the plurality of other users was last focused on the conversation, the level being determined based on when a conversation client application was open and had visibility on a display of a user device corresponding to one of the first user and the plurality of other users;

providing a rendering of the conversation content section and the conversation state information including the level in the conversation at which the first user and each of the plurality of other users was last focused on the conversation.

2. A method comprising:

receiving a communication message sent from a first user to a plurality of other users;

generating a persistent conversation object representing a conversation and having a conversation content section and conversation state information;

storing the communication message in the conversation content section of the persistent conversation object;

forwarding the communication message to the plurality of other users;

updating the conversation state information to reflect a level in the conversation at which each user was last focused on the conversation;

providing a rendering of the conversation content section and the conversation state information including the level in the conversation at which the first user and each of the plurality of other users were last focused on the conversation, the level being determined based on when a conversation client application was open and had visibility on a display of a user device corresponding to the first user and each of the plurality of other users.

3. The method of claim 2, wherein the communication message includes one or more of a text message, an image file, an audio file, a video file, a phone call, a fax, a one-to-one audio/video conference and a multi-way audio/video conference.

4. The method of claim 2, wherein the state information includes an indication of whether history tracking is enabled.

5. The method of claim 2, wherein the state information includes a focus state for each user.

6. The method of claim 2, further comprising:

providing for display a user interface including at least a portion of the conversation content, an avatar representing each user participating in the conversation and a visual indication of conversation state information.

7. The method of claim 6, further comprising updating the avatar appearance based on the focus state of the user corresponding to the avatar.

8. The method of claim 7, further comprising rendering, in a display of the conversation content, each avatar at a watermark point of the user associated with the avatar.

9. The method of claim 6, wherein the visual indication includes an indication of whether history tracking is enabled.

10. A system comprising:

one or more computers configured to perform operations including:

receiving a communication message sent from a first user to a plurality of other users;

generating a persistent conversation object representing a conversation and having a conversation content section and conversation state information;

storing the communication message in the conversation content section of the persistent conversation object;

forwarding the communication message to the plurality of other users;

updating the conversation state information to reflect a level in the conversation at which each user was last focused on the conversation;

providing a rendering of the conversation content section and the conversation state information including the level in the conversation at which the first user and each of the plurality of other users were last focused on the conversation, the level being determined based on when a conversation client application was open and had visibility on a display of a user device corresponding to the first user and each of the plurality of other users.

11. The system of claim 10, wherein the communication message includes one or more of a text message, an image file, an audio file, a video file, a phone call, a fax, a one-to-one audio/video conference and a multi-way audio/video conference.

12. The system of claim 10, wherein the state information includes an indication of whether history tracking is enabled.

13. The system of claim 10, wherein the state information includes a focus state for each user.

14. The system of claim 10, wherein the operations further include:

providing for display a user interface including at least a portion of the conversation content, an avatar representing each user participating in the conversation and a visual indication of conversation state information.

15. The system of claim 14, wherein the operations further include updating the avatar appearance based on the focus state of the user corresponding to the avatar.

16. The system of claim 15, wherein the operations further include rendering, in a display of the conversation content, each avatar at a watermark point of the user associated with the avatar.

* * * * *